March 3, 1959 — L. C. WASSON — 2,876,397
CONTROL DEVICE
Filed April 15, 1954 — 2 Sheets-Sheet 1

INVENTOR.
Loerwood C. Wasson
BY
Seegert & Schwalbach
Att'ys

March 3, 1959

L. C. WASSON 2,876,397

CONTROL DEVICE

Filed April 15, 1954

INVENTOR.
Loerwood C. Wasson
BY
Seegert + Schwalbach
Attys 2,876,397
Patented Mar. 3, 1959

2,876,397

CONTROL DEVICE

Loerwood C. Wasson, Milwaukee, Wis., assignor to Baso Inc., Milwaukee, Wis., a corporation of Wisconsin Application April 15, 1954, Serial No. 423,313

11 Claims. (Cl. 317—171)

This invention relates to improvements in control devices and more particularly to control devices including magnetic latching mechanisms.

There are many applications wherein it is desirable to provide a control device in which a member is held or latched in one position and is released upon the occurrence of a predetermined condition. An example of a control device of this general type is one wherein an armature is held in attracted position with respect to a permanent magnet against a biasing force, and is released by current flow through a flux-generating coil associated with said permanent magnet, said release being effected by neutralization of the permanent magnet flux by flux from said coil. In control devices of the aforementioned character wherein the attractive force of the permanent magnet thereof is capable of overcoming a substantial armature biasing force, for example a force on the order of 1.25 pounds, a current of substantial magnitude must be supplied to the flux-generating coil in order to effect release of the armature. While it is very desirable to have a control device of the aforedescribed type which is operable on thermoelectric power, the control devices heretofore developed have current requirements which are substantially greater than that which can be supplied by a thermoelectric generator.

With this in mind, a principal object of the present invention is to provide an improved control device having a movable member and having permanent magnet means for retaining said member in one position against a biasing force of substantial magnitude, there being means for releasing said member in response to energization by current of small magnitude, for example thermoelectric or photoelectric current.

Another object of the invention is to provide a control device of the class described in which the movable member is released from latched position in response to a predetermined condition, for example a predetermined temperature sensed by a thermoelectric generator for powering said releasing means.

Another object of the invention is to provide an improved control device of the aforementioned character in which release of the movable member is effected by diversion of permanent magnet flux from one low reluctance path to an alternate path, as distinguished from neutralization of said magnet flux.

More specifically, an object of the invention is to provide an improved control device of the character described comprising a permeable magnet structure having three pole pieces and having a permeable armature biased away from said pole pieces and movable to an attracted position with respect to said pole pieces to form therewith magnetic flux paths through two pole pieces which are lower in reluctance than the magnetic path through the third pole piece, the magnetic path through said third pole piece including permanent magnet flux-generating means for holding the armature in attracted position against said biasing means. In the improved magnetic structure the moments about the pole face of any of said pole pieces of the attractive forces exerted on the armature by the permanent magnet flux is normally greater than the moment of said armature bias about said pole face. Flux-generating means powered thermo-electrically, or from another low energy source, is provided for diverting the permanent magnet flux flow away from one of said pole pieces, whereby the magnetic pull on the armature at the pole face of said one pole piece is diminished to the point where the total moment of the magnetic pull on the armature is less than moment of said armature bias, whereupon the armature moves away from all of said pole faces under the influence of said bias.

Another object of the invention is to provide an improved control device of the aforedescribed character wherein the armature when set to attracted position can be held in said position against the bias thereof either by the attractive force of the permanent magnet flux alone or by the attractive force of the permanent magnet flux plus the attractive force generated by the flux-generating means, diminution of the flux flow at one of the pole faces, and hence release of the armature, being effected by energization of the thermo-electrically powered flux-generating means if the latter is deenergized, or by deenergization of said means if the latter is energized.

Another object of the invention is to provide an improved control device of the class described which is simple in construction, inexpensive to manufacture, and otherwise well adapted for the purposes described.

Other objects and advantages of the invention will become apparent as the description proceeds, reference being had to the accompanying drawing illustrating one embodiment of the invention, and wherein like characters of reference indicate the same parts in all of the views. In the drawing.

Figure 1:
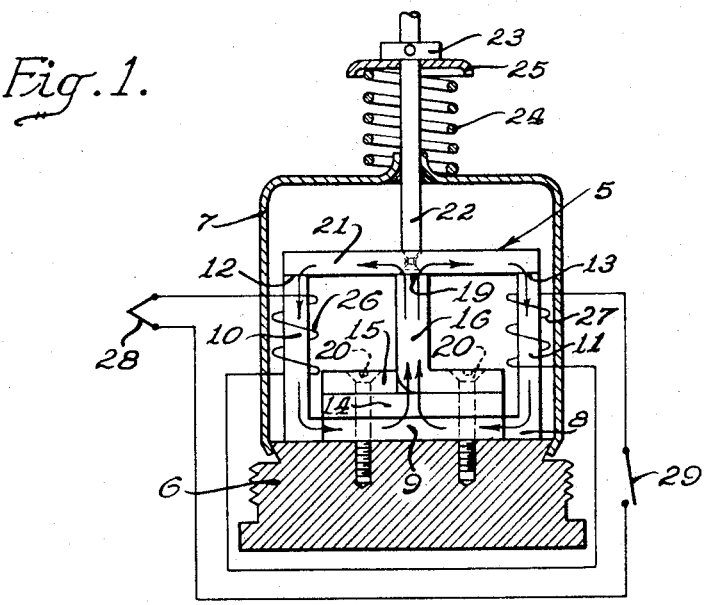
Figure 1 is a semi-diagrammatic elevational view partly in section illustrating one form of the invention and showing the armature in attracted position.

Referring to Figure 1 of the drawing, the form of the improved control device illustrated comprises a magnetic latching mechanism indicated generally by the numeral 5. The mechanism 5 is mounted on an externally threaded fitting 6 and is enclosed within a hood or casing 7 fixed coaxially to said fitting as shown.

Figure 4:
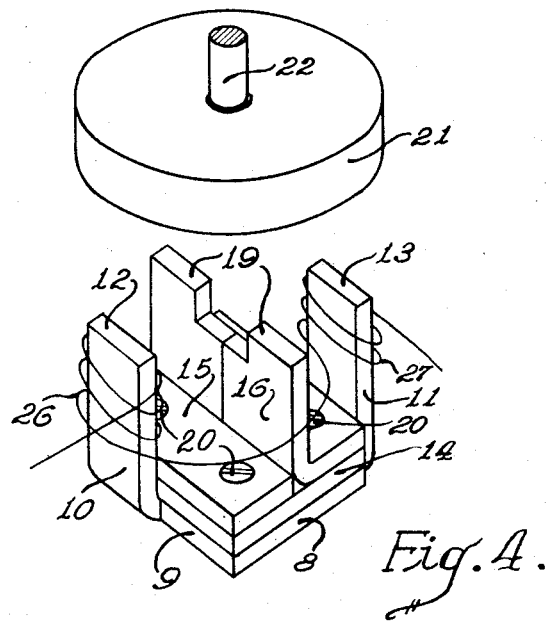
Figure 4 is a fragmentary perspective view of the magnet structure and armature of the improved control device.
Figure 4A:
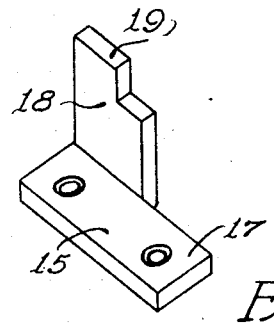
Figures 4a and 4b are perspective views of the angle members constituting the intermediate pole piece of the magnet structure of the illustrated form of the improved control device.
Figure 4B:
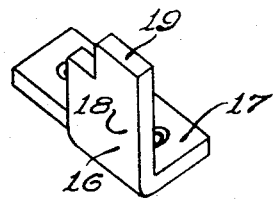
Figure 4C:
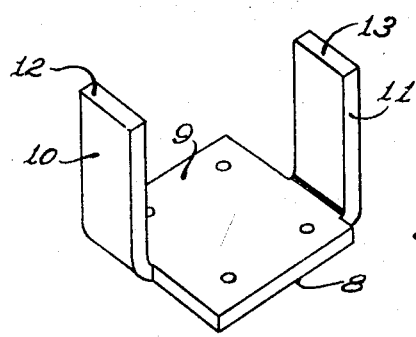
Figure 4c is a perspective view of the generally U-shaped member providing the outer pole pieces of the magnet structure of the improved control device.

The structure of the latching mechanism 5 is shown most clearly in Figures 4 to 4c, and comprises a magnetically permeable, generally U-shaped member 8 which may have a rectangular base plate or transverse intermediate portion 9 and a pair of spaced upstanding pole pieces 10 and 11, said pole pieces having coplanar pole faces 12 and 13. Superimposed on the portion 9 of the magnet member 8 and in flux-conducting contact therewith is a permanent magnet 14 in the form of a rectangular plate having substantially the same size and shape as the portion 9 of the member 8. The polarity of the magnet 14 is such that the lower surface thereof is of one polarity, and the upper surface thereof is of the opposite polarity.

Figure 2:
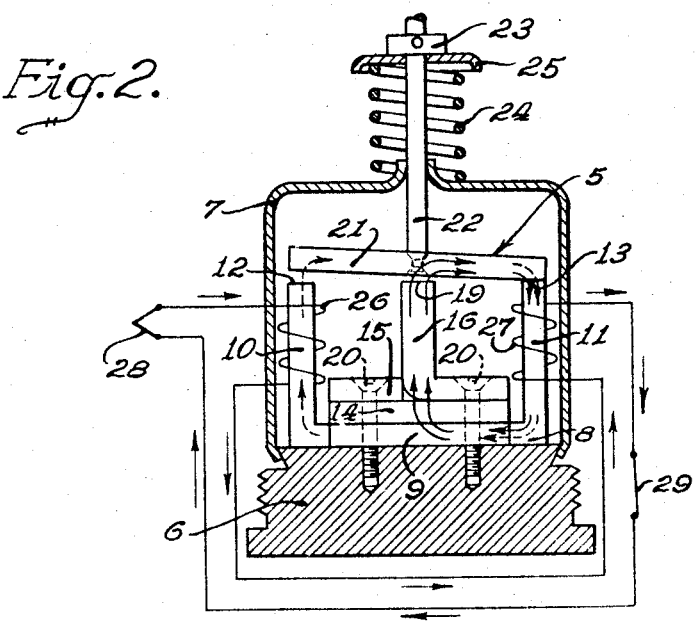
Figure 2 is a view similar to Figure 1 showing the armature in an intermediate position during releasing movement thereof.
Figure 3:
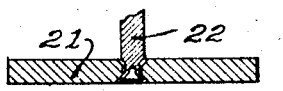
Figure 3 is a fragmentary transverse vertical sectional view illustrating the pivotal connection between the armature and the stem therefor.

A pair of substantially identical magnetically permeable angle members 15 and 16 are formed as shown most clearly in Figures 4a and 4b, said members each having a rectangular base plate portion 17 and an upstanding pole piece portion 18. The upper ends of the pole piece portions 18 of the members 15 and 16 are provided with pole faces 19. The members 15 and 16 are interfitted to in effect form a single pole piece, and are positioned with the base plate portions 17 thereof superimposed on the permanent magnet 14 as shown in Figure 4. The base plate portions 17 are in flux-conducting contact with substantially the entire upper surface area of the permanent magnet 14. Suitable screws 20 extend through the portions 17 of the members 15 and 16, the permanent magnet 14, and the portion 9 of the member 8, said screws being threaded into the fitting 6 as shown in Figures 1 and 2, to hold the parts in assembled relation.

The pole faces 12, 13 and 19 are coplanar, and a magnetically permeable armature 21, which may be circular in shape, has a plane surface which is adapted to be positioned in flux-conducting contact with all of said pole faces as shown in Figure 1. The armature 21 is provided with a stem 22 which axially slidably extends through a suitable bearing in the end wall of the casing 7 and may have a collar 23 fixed thereon at a point spaced externally from said end wall. A helical compression spring 24 surrounds the stem 22, having one end in abutment with the end wall of the casing 7, and having its opposite end in abutment with a disk 25 on said stem and in abutment with the collar 23. The compression spring 24 biases the stem 23 and armature 21 axially outwardly away from the pole faces 12, 13 and 19.

When the armature 21 is in flux-conducting contact with the pole faces 12, 13 and 19 as shown in Figure 1, the flux generated by the permanent magnet 14 flows as indicated by the arrows in Figure 1, through the two closed, low-reluctance paths provided by the members 15 and 16, armature 21, and the member 8. The attractive force exerted on the armature 21 by the permanent magnet flux flow through the pole faces 12, 13 and 19 detains said armature in engagement with said pole faces against the bias of the spring 24. In the illustrated form of the invention, the pole faces 12 and 13 are of substantially equal area and are equally spaced from the poles faces 19 so that the attractive forces exerted on the armature 21 at the pole faces 12 and 13 are balanced with respect to the stem 22. Other arrangements are obviously possible within the concept of the invention, however. With the illustrated arrangement the sum of the attractive forces exerted on the armature 21 at the pole faces 12, 13 and 19 must be greater than the biasing force of the spring 24 in order for the armature to be held in attractive position. This is true because of the moments about any of said pole faces of the attractive forces exerted on said armature exceeds the moment about the same pole face of the biasing force of the spring 24. In certain forms of the improved control device, the spring 24 may have a biasing force of approximately 1.25 pounds.

Means are provided for effecting release of the armature 21 from the magnet structure, said means including flux-generating means which in the illustrated embodiment takes the form of energizing coils 26 and 27 wound on the pole pieces 10 and 11 respectively. Coils 26 and 27 are connected in series circuit relationship with each other and with a source of small electric current, for example thermoelectric generator 28 in the form of a thermocouple. The circuit for the coils 26 and 27 and generator 28 may include a circuit-controlling device, for example the switch 29. The connections between the coils 26 and 27, and the mounting of said coils on the pole pieces 10 and 11 are such that both coils tend to cause flux flow in the same direction through the closed path afforded by the U-shaped member 8 and the armature 21, for example in the direction indicated by the broken arrows in Figure 2.

When the thermocouple 28 is heated and the switch 29 is closed, energizing current flows through the circuit including the coils 26 and 27 as shown in Figure 2. The energized coils 26 and 27 generate a flow of flux indicated by the broken arrows in Figure 2. It will be noted that the flux flow indicated by the broken arrows reinforces the permanent magnet flux flow through the pole piece 11 indicated by the solid arrows, and opposes the permanent magnet flux flow through the pole piece 10. This opposition is effective to divert a substantial part or all of the permanent magnet flux emanating from the pole faces 19 away from the pole piece 10 and toward the pole piece 11 as indicated by the solid arrows in Figure 2.

The effect of the aforedescribed diversion of flux flow is to cause a decrease in the flux flow through the pole face 12. As the flux flow through the pole face 12 diminishes, the attractive force or magnetic pull exerted on the armature 21 at said pole face is correspondingly diminished. When the attractive force at the pole face 12 is diminished in this manner, the moments of all of the armature attracting forces about one of the pole faces, for example the pole face 13, become smaller than the moment about the same pole face of the biasing force of the spring 24. As a result, the armature is pulled away from the magnet structure, initially with a hinging action, as shown in Figure 2, and then with complete separation therefrom.

The stem 22 may be connected to any suitable mechanism (not shown) which it is desired to have actuated by release of the armature. Means (not shown) may also be provided for resetting the armature 21 into contact with the pole faces 12, 13 and 19 after release, or resetting of the armature may, if desired, be effected by manually moving the stem 22 in the proper direction.

If the armature 21 is reset to the position of Figure 1 while current is flowing through the coils 26 and 27 as shown in Figure 2, flux flow through the pole piece 10 is established in the direction indicated by the dotted arrows in Figure 2, and this flux flow, plus the permanent magnet flux flow indicated by the solid arrows in Figure 2, creates sufficient attractive force to retain said armature in reset or attracted position. Interruption of current flow through the coils, however, for example by opening the switch 29 or by cooling of the thermocouple 28, causes dissipation of flux generated by said coils and permits the permanent magnet flux to again tend to flow through the pole piece 10 as shown in Figure 1. This necessarily effects a diminution of flux flow through the pole face 12, and as a result, the armature is released from the magnet structure in the manner previously described.

In the improved control device, release of the latching mechanism is effected by diversion of the permanent magnet flux, rather than by neutralization of said flux. By virtue of this fact, the latching mechanism can be released by the relatively small amount of current available from a thermoelectric generator. The flux generated by current flow through the coils 26 and 27 does not tend to flow through the permanent magnet 14 and pole faces 19 because of the inherently high reluctance of said permanent magnet and the fact that the armature 21 and member 8 provide a low reluctance path for said flux.

The improved control device is under the control of both the thermocouple 28 and the circuit-controlling device 29. The improved device is condition responsive in that the output of the thermoelectric generator 28 depends upon the amount of heat to which it is subjected. For example, the switch 29 may be closed and the thermocouple 28 may be exposed to a temperature at which it generates insufficient current to cause release of the armature. When the temperature to which the thermocouple 28 is exposed reaches a predetermined level, however, it generates sufficient current to effect release of the armature 21. Conversely, if the armature is held in attracted position by the combined attractive forces exerted by the permanent magnet flux and flux generated by current flow through the coils 26 and 27, predetermined drop in the temperature to which the couple 28 is sensitive causes dissipation of the flux flow generated by said coils and release of the armature. On the other hand, the couple 28 may be continually subjected to a temperature at which it generates sufficient current to effect release of the armature 21, with release of said armature being controlled by actuation of the switch 29 from one position to the other to thereby establish or interrupt current flow through the coils 26 and 27.

The form of the invention illustrated and the corresponding description have been used for the purpose of disclosure only, and are not intended to impose unnecessary limitations on the claims, or to confine the patented invention to a particular use. Various changes and modifications may be made without departing from the spirit of the invention, and all of such changes are contemplated as may come within the scope of the claims.

What is claimed as the invention is:

1. A releasable magnetic latching mechanism comprising, a magnetic structure comprising a magnet core formed with at least two pole faces and an armature for said core having a retracted position with respect thereto and an attracted position with respect thereto wherein said armature and core cooperate to provide two magnetic flux paths having a common core portion and including respectively said pole faces, means operable on said armature at a point spaced from both of said pole faces to bias said armature toward retracted position, magnetic flux means associated with said common core portion to normally afford flux flow in both of said flux paths to retain said armature in attracted position when moved thereto, and flux generating means operatively associated with one of said flux paths to divert the flux flow normally afforded therein by said magnetic flux means to the other of said flux paths to enable said biasing means to pivot said armature about the pole face in said other flux path and thereby increase the magnetic reluctance in both of said paths for return of said armature to its retracted position.

2. A releasable magnetic latching mechanism comprising, a magnetic structure comprising a magnet core formed with at least two pole faces and an armature for said core having a retracted position with respect to said pole faces and an attracted position with respect thereto wherein said armature and core cooperate to provide two magnetic flux paths having a common core portion and including respectively said pole faces, means operable on said armature at a point spaced from both of said pole faces to bias said armature toward retracted position, a permanent magnet in said common core portion to normally afford flux flow in both of said flux paths to retain said armature in attracted position when moved thereto, and electromagnetic flux generating means operatively associated with one of said flux paths and energizable to divert the flux flow normally afforded therein by said magnetic flux means to the other of said flux paths to enable said biasing means to pivot said armature about the pole face in said other flux path and thereby increase the magnetic reluctance in both of said paths for return of said armature to its retracted position.

3. A releasable magnetic latching mechanism comprising, a magnetic structure comprising a magnet core formed with at least two pole faces and an armature for said core having a retracted position with respect to said pole faces and an attracted position with respect thereto wherein said armature and core cooperate to provide two magnetic flux paths having a common core portion and including respectively said pole faces, magnetic flux means associated with said common core portion to normally afford flux flow in both of said flux paths to accord an attractive force on said armature at both of said pole faces to retain said armature in attracted position when moved thereto, flux generating means operatively associated with one of said flux paths to divert the flux flow normally afforded therein by said magnetic flux means to the other of said flux paths, and biasing means operable on said armature to create a moment thereon about the pole face in said other flux path to pivot said armature about the pole face in said other flux path upon generation of flux by said flux generating means to thereby increase the magnetic reluctance in both of said paths for return of said armature to its retracted position.

4. A releasable magnetic latching mechanism comprising, a magnetic structure comprising a magnet core formed with at least two pole faces and an armature for said core having a retracted position with respect thereto and an attracted position with respect thereto wherein said armature and core cooperate to provide two magnetic flux paths having a common core portion and including respectively said pole faces, means operable on said armature at a point spaced from both of said pole faces to bias said armature toward retracted position, magnetic flux means associated with said common core portion to normally afford flux flow in both of said flux paths to retain said armature in attracted position when moved thereto, and flux generating means operatively associated with one of said flux paths and energizable by an electric current merely sufficient to divert the flux flow normally afforded in said one path by said magnetic flux means to the other of said flux paths to enable said biasing means to pivot said armature about the pole face in said other flux path and thereby increase the magnetic reluctance in both of said paths for return of said armature to its retracted position, whereby said latching mechanism is released in response to an electric current considerably smaller than that required to neutralize the flux afforded by said magnetic flux means.

5. A releasable magnetic latching mechanism comprising, a magnetic structure comprising a magnet core formed with at least two pole faces and an armature for said core having a retracted position with respect thereto and an attracted position with respect thereto wherein said armature and core cooperate to provide two magnetic flux paths having a common core portion and including respectively said pole faces, means operable on said armature at a point spaced from both of said pole faces to bias said armature toward retracted position, magnetic flux means associated with said common core portion to normally afford flux flow in both of said flux paths to retain said armature in attracted position when moved thereto, and flux generating means operatively associated with one of said flux paths and energizable by a small electric current to divert the flux flow normally afforded in said one path by said magnetic flux means to the other of said flux paths to enable said biasing means to pivot said armature about the pole face in said other flux path and thereby increase the magnetic reluctance in both of said paths for return of said armature to its retracted position whereby said latching mechanism is released in response to an electric current which is considerably smaller than that required to neutralize the flux afforded by said magnetic flux means.

6. A releasable magnetic latching mechanism comprising, a magnetic structure comprising a magnet core formed with at least two pole faces and an armature for said core having a retracted position with respect thereto and an attracted position with respect thereto wherein said armature and core cooperate to provide two magnetic flux paths having a common core portion and including respectively said pole faces, means operable on said armature at a point spaced from both of said pole faces to bias said armature toward retracted position, a permanent magnet in said common core portion to normally afford flux flow in both of said flux paths to retain said armature in attracted position when moved thereto, and flux generating means operatively associated with one of said flux paths and a thermoelectric generator for energization thereof to divert the flux flow normally afforded in said one path by said magnetic flux means to the other of said flux paths to enable said biasing means to pivot said armature about the pole face in said other flux path and thereby increase the magnetic reluctance in both of said paths for return of said armature to its retracted position, whereby said latching mechanism is released in response to thermoelectric current which is considerably smaller than that required to neutralize the flux afforded by said magnetic flux means.

7. A releasable magnetic latching mechanism comprising, a magnetic structure comprising a magnet core including a permanent magnet and formed with at least two pole faces and an armature for said core having a retracted position with respect thereto and an attracted position with respect thereto wherein said armature and core cooperate to provide two magnetic flux paths having a common portion comprising said permanent magnet and including respectively said pole faces, means biasing said armature toward retracted position, said permanent magnet normally affording flux flow in both of said flux paths to retain said armature in attracted position when moved thereto, and flux generating means operatively associated with one of said flux paths and energizable to divert the flux flow normally afforded therein by said magnetic flux means to the other of said flux paths to enable said biasing means to pivot said armature about the pole face in said other flux path and thereby increase the magnetic reluctance in both of said paths for return of said armature to its retracted position.

8. A releasable magnetic latching mechanism comprising, a magnetic structure comprising a magnet core formed with at least two pole faces and an armature for said core having a retracted position with respect thereto and an attracted position with respect thereto wherein said armature and core cooperate to provide two magnetic flux paths having a common core portion and including respectively said pole faces, means operable on said armature at a point spaced from both of said pole faces to bias said armature toward retracted position, magnetic flux means associated with said common core portion to normally afford flux flow in both of said flux paths, and flux generating means operatively associated with one of said flux paths and energizable to divert the flux flow normally afforded in said one path by said magnetic flux means to the other of said flux paths and to afford flux flow in said one flux path to effect retention of said armature in attracted position when moved thereto, deenergization of said flux generating means enabling said biasing means to pivot said armature about the pole face in said other flux path and thereby increase the magnetic reluctance in both of said paths for return of said armature to its retracted position.

9. A releasable magnetic latching mechanism comprising, a magnetic structure comprising a magnet core formed with at least two pole faces and an armature for said core having a retracted position with respect thereto and an attracted position with respect thereto wherein said armature and core cooperate to provide two magnetic flux paths having a common core portion and including respectively said pole faces, means operable on said armature to bias said armature toward retracted position and to permit relative pivotal movement between said armature and said magnetic structure during movement of said armature to retracted position, magnetic flux means associated with said common core portion to normally afford flux flow in both of said flux paths, and flux generating means operatively associated with one of said flux paths and energizable by a thermo-electric generator to divert the flux flow normally afforded in said one path by said magnetic flux means to the other of said flux paths and to afford flux flow in said one flux path sufficient to effect retention of said armature in attracted position when moved thereto, deenergization of said flux generating means enabling said biasing means to pivot said armature about the pole face in said other flux path and thereby increase the magnetic reluctance in both of said paths for return of said armature to its retracted position.

10. A releasable magnetic latching mechanism comprising, a magnetic structure comprising a magnet core formed with three coplanar pole faces and an armature for said core having a retracted position with respect to said pole faces and an attracted position with respect thereto wherein said armature and core cooperate to provide two magnetic flux paths having a common core portion including one of said pole faces and including respectively said other pole faces, means operable on said armature at a point spaced from said other pole faces to bias said armature toward retracted position, magnetic flux means associated with said common core portion to normally afford flux flow in both of said flux paths to retain said armature in attracted position when moved thereto, and flux generating means operatively associated with both of said flux paths to divert the flux flow normally afforded in one of said paths by said magnetic flux means to the other of said flux paths to enable said biasing means to pivot said armature about the pole face particular to said other flux path and thereby increase the magnetic reluctance in both of said paths for return of said armature to its retracted position.

11. A releasable magnetic latching mechanism comprising, a magnetic structure comprising a magnet core formed with first and second pole faces and a permanent magnet affording a third pole face, said magnetic structure also comprising an armature for said core having a retracted position with respect to said pole faces and an attracted position with respect thereto wherein said armature and core cooperate to provide two magnetic flux paths each of which includes said first pole face and a separate one of said second and third pole faces, means operable on said armature at a point spaced from said third pole face to bias said armature toward retracted position, said biasing means creating a moment on said armature about said third pole face, said permanent magnet normally affording flux flow in both of said flux paths to retain said armature in attracted position when moved thereto, and a winding associated with the flux paths including said second pole face and energizable to divert the flux flow normally afforded therein by said permanent magnet to the flux path including said third path to enable said biasing means to pivot said armature about said third pole face and thereby increase the magnetic reluctance in both of said flux paths for return of said armature to its retracted position.

References Cited in the file of this patent

UNITED STATES PATENTS

| | | |
|---|---|---|
| 1,534,753 | Watson | Apr. 21, 1925 |
| 1,730,447 | Bruninga | Oct. 8, 1929 |
| 1,770,090 | Slisz | July 8, 1930 |
| 2,130,870 | Boehne | Sept. 20, 1938 |
| 2,240,812 | Sparrow | May 6, 1941 |
| 2,458,939 | Hall | Jan. 11, 1949 |
| 2,486,086 | Willing | Oct. 25, 1949 |
| 2,738,449 | Mason | Mar. 13, 1956 |